Figure 1:
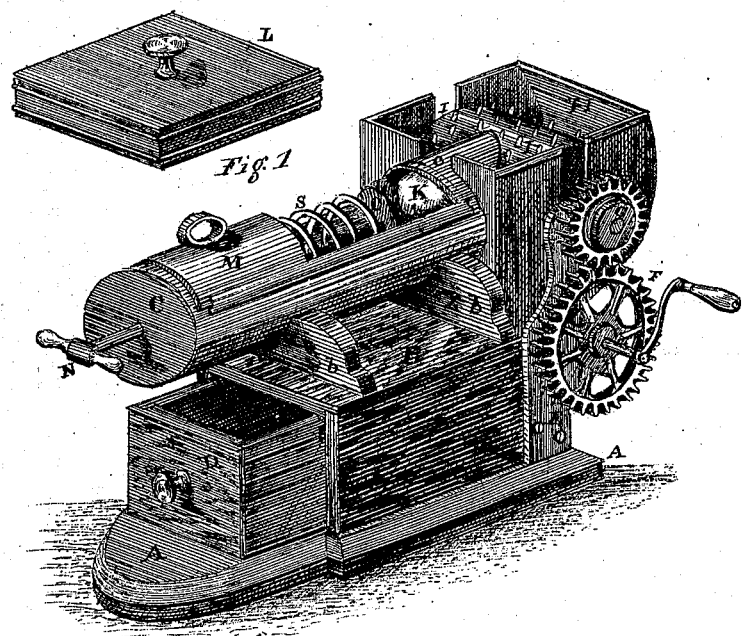

L. Schmidt,
Grater.

No. 100,809.    Patented Mar. 15, 1870.

Witnesses.        Inventor.
Wm. B. Wiley     Leonhard Schmidt
Jacob Stauffer

United States Patent Office.

LEONHARD SCHMIDT, OF LANCASTER, PENNSYLVANIA.

Letters Patent No. 100,809, dated March 15, 1870.

IMPROVED GRATER.

The Schedule referred to in these Letters Patent and making part of the same.

I, LEONHARD SCHMIDT, of the city of Lancaster, in the State of Pennsylvania, have invented certain Improvements in a Machine or Mill for Grating Cocoanut, Horse-Radish, Nutmegs, or the like, of which the following is a specification.

Confectioners find it a laborious process to grate cocoa and the like, by the ordinary means known or in use, and some improvement in the mode of rubbing up or grating is greatly needed. To meet this want is the object of my invention.

The perspective drawing, Figure 1, clearly illustrates the construction and arrangement of all its parts, and an explanation of the letters of reference marked thereon will enable any one skilled in the art to make and use my invention.

A is a bottom, projecting in front of a box, B.

On the top of this box are a pair of bracket-supports, b, for a horizontal cylindrical box, C, which is secured to said brackets, and a rear hopper, H, or appended chamber, in which there is a drum or rubber, I, provided with a series of cutting-teeth forming the grater or rubber. The sides of this hopper-box H are open, for the purpose of lifting out the grater I for cleaning it.

This roller or rubber I has a shaft, with a pinion, G, on one end, which is driven by a larger cogged wheel, F, by means of a crank-handle, for giving a rapid motion to the grater or rubber I.

This gearing has its bearings in the side brackets E, one on each side.

The horizontal cylindrical box C has a sliding lid, M, shown drawn forward, to reveal the coiled spring S and plunger O attached to a central rod or piston within the chamber or cylinder.

This piston-rod passes through a pipe or collar to the outside, where it is provided with a handle, N.

The lid L for the hopper-box H is shown separately.

There is also a drawer, D, in the box B, shown partly drawn out.

The manner of using this machine is self-evident.

The plunger N O is drawn out. The cocoa K put behind the plunger O. The lid M slid back to close the cylinder C, which latter projects above, over the rubber within the box H, marked c. This box or hopper is covered by the lid L. It is evident that the coiled spring will press the material against the rubber I, and, by turning the handle, it is made to revolve with rapidity, so as speedily to rub up or grate the cocoa or other like material submitted to its action.

Confectioners will find it a desirable invention, and it is well calculated for various culinary purposes.

I am aware that, separately considered, there is no special novelty apart from the arrangement.

What I claim as my invention, and desire to secure by Letters Patent, is—

The arrangement and combination of the box B, drawer D, when surmounted by a cylindrical chamber, c, and provided with a horizontal spring rod, N, and plunger O, together with the rubber-box H and rubber I, and cogged gear G F, in the manner shown and for the purpose described.

LEONHARD SCHMIDT.

Witnesses:
WM. B. WILEY,
JACOB STAUFFER.